No. 761,698. PATENTED JUNE 7, 1904.
J. L. McQUARRIE.
TELEPHONE SWITCHBOARD APPARATUS.
APPLICATION FILED NOV. 24, 1902.
NO MODEL.
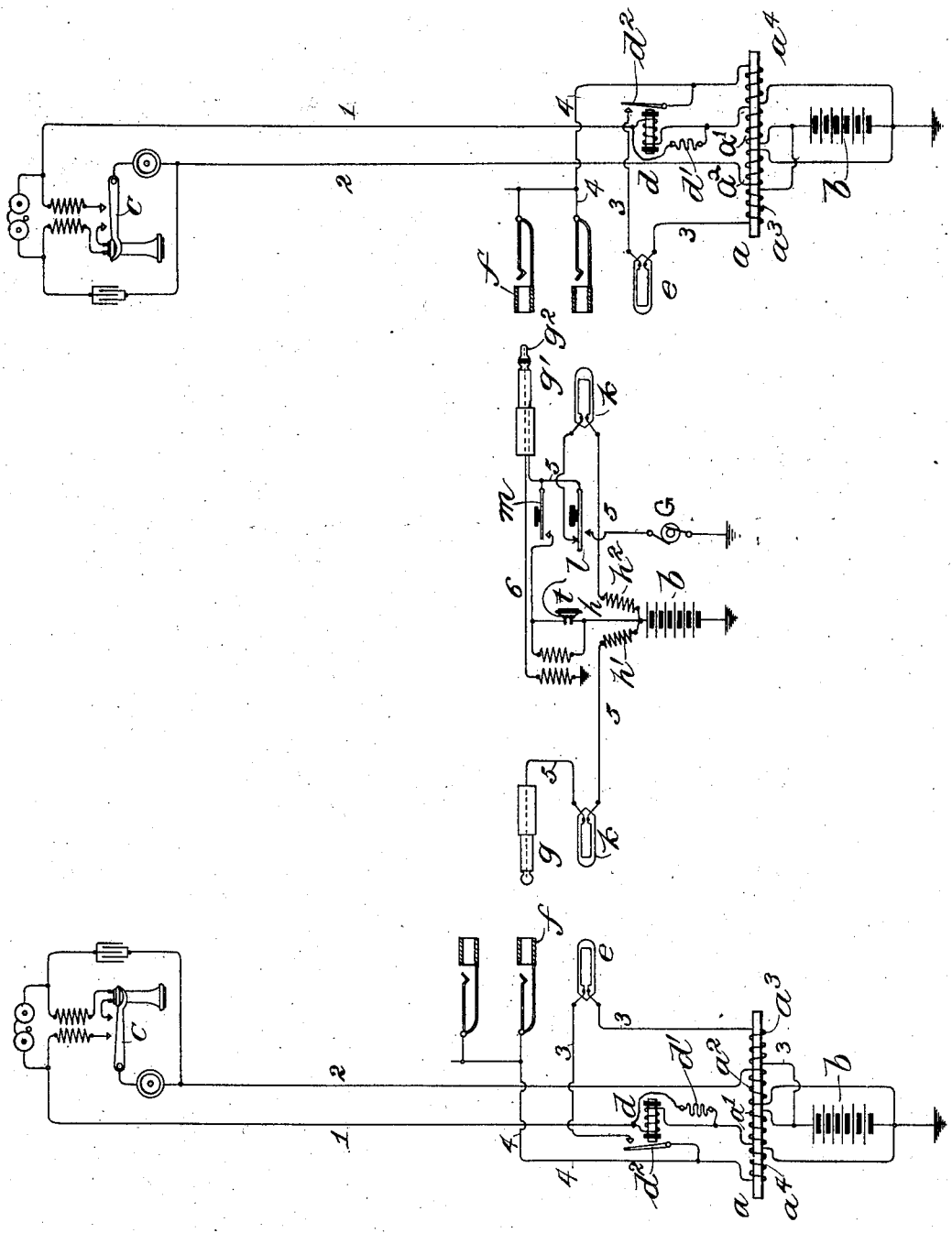
Witnesses:
J. W. Shinkle.
W. H. Leach.
Inventor:
James L. McQuarrie,
By George H. Barton
Attorney.

No. 761,698.

Patented June 7, 1904.

UNITED STATES PATENT OFFICE.

JAMES L. McQUARRIE, OF CHICAGO, ILLINOIS, ASSIGNOR TO WESTERN ELECTRIC COMPANY, OF CHICAGO, ILLINOIS, A CORPORATION OF ILLINOIS.

TELEPHONE SWITCHBOARD APPARATUS.

SPECIFICATION forming part of Letters Patent No. 761,698, dated June 7, 1904.

Application filed November 24, 1902. Serial No. 132,522. (No model.)

*To all whom it may concern:*

Be it known that I, JAMES L. McQUARRIE, a citizen of the United States, residing at Chicago, in the county of Cook and State of Illinois, have invented a certain new and useful Improvement in Telephone Switchboard Apparatus, of which the following is a full, clear, concise, and exact description.

My invention relates to telephone-exchange switchboard apparatus, and has for its object to provide an improved organization by which two telephone-lines may be temporarily connected for conversation and the usual incidental signals transmitted with central-office connection-switches and accessory apparatus of exceedingly simple character.

It is possible by adopting my invention to use the simplest form of single-contact spring-jacks for the multiple-connection terminals of each line at the switchboard and still supply the subscribers' transmitting-telephones of the several lines with current from a central battery flowing over each line in a complete metallic circuit with standard automatic line-signals and supervisory signals operating in the usual manner and without seriously impairing the efficiency of the system for transmission of telephone and ringing currents.

I will describe my invention by reference to the accompanying drawing, which is a diagram illustrating two subscribers' lines extending in metallic circuit from substations to a central-office switchboard with the connection-switches and accessory apparatus at the switchboard for uniting the lines, the system being organized and equipped in accordance with my invention.

The features or combinations which I regard as novel will be pointed out in the appended claims.

Each line has two conductors 1 2, which extend from the usual substation apparatus through the windings $a'$ $a^2$, respectively, of a repeating-coil $a$ to the poles of a central battery $b$, the pole of said battery which is connected with the limb 2 being also connected to the earth. It should be noted that while three batteries (marked $b$) are shown in the drawing, for clearness of illustration, these may be and usually are one and the same battery. The apparatus at the substation includes the usual gravity telephone-switch $c$, controlling the circuit. A line-relay $d$ is permanently included in the circuit of conductor 1 at the central office and may be permanently shunted by a non-inductive resistance $d'$, as shown. The armature $d^2$ of the line-relay $d$ controls at its front contact a local circuit 3 extending from the free pole of battery $b$ through a winding $a^3$ of the repeating-coil and a line signal-lamp $e$ to the front contact of said relay and from the armature of said relay through another winding $a^4$, of the repeating-coil $a$ to earth. The line-terminal or spring-jack $f$ of the line is connected by conductor 4 through the winding $a^4$ to earth.

The operator is provided with a pair of plugs $g$ $g'$, adapted for insertion in the spring-jacks of the lines, said plugs being united by a link conductor 5. The windings $h'$ $h^2$ of a repeating-coil $h$ are interposed in the conductor 5, and the free pole of the grounded battery $b$ is connected to said link conductor between the windings of the repeating-coil. Supervisory signal-lamps $k$ $k$ are interposed in the conductor 5, one between each winding of the repeating-coil and the corresponding plug. When either of the plugs is inserted in the spring-jack of a subscriber's line, circuit is completed from the battery $b$ through a winding of the repeating-coil $h$ and the supervisory signal-lamp $k$ to the plug and thence from the spring-jack through the conductor 4 of the subscriber's line to earth through winding $a^4$ of the repeating-coil. If the line-relay $d$ of the line in question is excited, the line signal-lamp $e$ and winding $a^3$ of the repeating-coil are brought into parallel with the winding $h'$ of coil $h$ and lamp $k$, the winding $a^4$ being in the undivided portion of the circuit. The resistances of the coils and lamps are so proportioned to the battery that when both lamps are in parallel in the circuit which includes the common resistance $a^4$ neither lamp will receive sufficient current for its illumination. When, however, the branch 3, containing lamp $e$, is cut out at the contact of the relay $d$, the lamp $k$ receives increased current and becomes lighted. In the system illustrated the lamps $e$ and $k$ may be nine-volt lamps, the battery $b$ may have an electromotive force of twenty-four volts, and the resistance of the several repeating-coil windings may be thirty ohms each, except the winding $a^4$, which should have a resistance of one hundred and twenty ohms.

The plug-circuit may be provided with the usual ringing and listening keys $l$ $m$. The listening-key is adapted when depressed to connect the operator's telephone $t$ in a parallel or local circuit with the repeating-coil winding $e^2$. The ringing-key $l$ is adapted when depressed to sever the plug-circuit and connect the terminal thereof leading to the calling-plug with a grounded source G of alternating current suitable to actuate the subscriber's signal-bell. When this key is depressed, the circuit is completed from generator G to the plug $g'$, spring-jack $f$ of the line to be signaled, conductor 4, and through winding $a^4$ of repeating-coil $a$ to earth. Current flowing in this circuit induces a similar alternating current in the windings $a'$ $a^2$, which are permanently included in the line-circuit 12, and the signal-bell at the substation is rung by this induced current. The line-relay $d$ should be adjusted so that it will not respond to the induced ringing-current.

While it is possible to use a single-stranded plug-circuit, I have found it desirable for greater certainty of the busy test in multiple switchboards to provide a special test-tip $g^2$ for the calling-plug, which is connected through an extra conductor 6 to earth through a winding of the operator's telephone induction-coil. With this arrangement when the tip of the plug is touched to the spring-jack of the line no click will be produced in the telephone unless a potential exists at the jack, due to connection with the line at some other spring-jack.

It is understood, of course, that the representations in the drawing of the various instruments are purely diagrammatic. For example, the windings of the repeating-coils $a$ $a$ are illustrated as distributed at different points along the length of the core, whereas, in fact, the convolutions would be wound in proper inductive relation to one another in accordance with well-understood requirements.

The operation, briefly, is as follows: When the subscriber at a substation desires his line to be connected at the central office with another line, he sends the call in the usual manner by removing his telephone from its hook. This closes the circuit of battery $b$ through the line-relay $d$, which draws up its armature $d^2$, and thus closes the local circuit 3. The lamp $e$ being illuminated by current flowing in this local circuit attracts the attention of the operator, who responds by inserting the answering-plug of her pair into the spring-jack $f$ of the line with which the lighted lamp is associated. By this act the supervisory lamp $k$ is brought into parallel with the lamp $e$ and each shunts out the other, so that neither receives sufficient current for its illumination. The operator now by depressing her listening-key $m$ brings her telephone inductively into circuit with the subscriber's telephone and inquires the number of the subscriber wanted. Having received this information, the operator tests the spring-jack of that line by touching the tip of the calling-plug thereto and listening in her telephone to determine whether or not a connection already exists with the line wanted at some other of the multiple spring-jacks of that line. If such connection exists, the spring-jack $f$ will have a potential through the battery $b$, which will cause a warning-click in the operator's telephone. If, however, the line wanted is free, no click is heard, and the connection is completed by inserting the calling-plug in the spring-jack, whereupon the ringing-key $l$ is depressed to ring the bell at the called station, as before described. Until the call party answers his line-relay will be inert, so that the branch containing his line-lamp will be opened. The supervisory lamp $k$ associated with the calling-plug will therefore receive current for its illumination until the line-relay of the called line is excited. As soon as said line-relay is excited the armature thereof connects the branch 3 in parallel with the branch containing the supervisory lamp, so that the line and supervisory lamps of both subscribers remain dark while the connected lines are in use for conversation. Telephone-currents are propagated from the repeating-coil of one line to the plug-circuit repeating-coil $h$, thence through the repeating-coil $a$ of the other line and by said last-mentioned repeating-coil to the distant station. Telephone-currents passing through the single conductor of the plug-circuit find path through both windings $a^3$ and $a^4$ of the repeating-coil in parallel, so that both said windings are effective. When the conversation is finished, both parties hang up their telephones, so that the line-relays $d$ $d$ become inert, cutting out the line-lamps $e$ $e$, whereby the supervisory lamps $k$ $k$ are illuminated and constitute a signal to the operator to take down the connection.

Having thus described my invention, I claim—

1. In a telephone-exchange system, the combination with a central battery, of telephone-lines each extending in metallic circuit from a substation having a telephone-switch, to the poles of said central battery, a connection-switch for each line, a local switchboard-circuit having two branches, one of said branches including a line-signal and means for controlling said branch through the agency of the substation telephone-switch, and the other branch arranged to be completed by said connection-switch, and including a supervisory signal, and a repeating-coil permanently associated with each line, one winding of said coil being included in the line-circuit and another winding included in the undivided portion of said local switchboard-circuit.

2. The combination with a telephone-line extending from a substation to a central office, of a switch at the substation controlling the circuit, a source of current, a line-relay and a winding of a repeating-coil permanently included in the line-circuit at the central office, a local circuit controlled by said line-relay including a line-signal and a second winding of said repeating-coil, a connection-switch and a telephone-circuit established by said connection-switch including said last-mentioned repeating-coil winding, said telephone-circuit being adapted to shunt the line-signal, whereby said line-signal is effaced when connection is made with the line.

3. In a telephone-exchange system, the combination with a grounded central battery, of telephone-lines each extending in two metallic conductors to the poles, respectively, of said battery, a telephone-switch controlling the circuit at each substation, a repeating-coil for each line at the central office, two windings $a'$ $a^2$ of said coil being permanently included in the circuit of the line conductors respectively, a local switchboard-circuit for each line, having two branches, one of said branches including a winding $a^3$ of the repeating-coil and a line-signal, a line-relay in one of the line conductors controlling said branch, a fourth winding $a^4$ of the repeating-coil included in the undivided portion of said switchboard-circuit, multiple spring-jacks for each line forming normally open terminals of the other branch of the local switchboard-circuit, a link conductor having plug-terminals each adapted for insertion in a spring-jack of a line, repeating-coil windings $h'$ $h^2$ interposed in the link conductor, the free pole of the central battery being connected to said link conductor between said windings $h'$ $h^2$, whereby in plugging into a spring-jack of a line the second branch of the local switchboard-circuit of that line is closed in parallel with the first branch, and supervisory signals in the link conductor, one between the battery connection and each plug.

In witness whereof I hereunto subscribe my name this 27th day of October, A. D. 1902.

JAMES L. McQUARRIE.

Witnesses:
  ELLA EDLER,
  EDWIN H. SMYTHE.